(12) United States Patent  
Eray

(10) Patent No.: US 6,965,757 B2
(45) Date of Patent: Nov. 15, 2005

(54) MULTIBAND SHORT RANGE RADIO RECEIVER FOR MOTOR VEHICLE DATA

(75) Inventor: Yves Eray, Colombes (FR)

(73) Assignee: Johnson Controls Automotive Electronics, Osny (FR)

( * ) Notice: Subject to any disclaimer, the term of this patent is extended or adjusted under 35 U.S.C. 154(b) by 698 days.

(21) Appl. No.: 09/846,909

(22) Filed: May 1, 2001

(65) Prior Publication Data

US 2001/0039185 A1 Nov. 8, 2001

(30) Foreign Application Priority Data

May 4, 2000 (FR) .................................. 00 05689

(51) Int. Cl.[7] .............................................. H04B 1/18
(52) U.S. Cl. .............................. 455/151.2; 455/152.1; 455/352; 340/825.22; 340/825.69
(58) Field of Search .................... 455/152.1, 151.2, 455/352, 92, 151.3, 353, 188.1, 255, 189.1, 455/318, 190.1, 180.1, 163; 340/825.22, 340/825.69, 825.31, 825, 310.01, 426.36, 340/825.72, 5.2, 5.64

(56) References Cited

U.S. PATENT DOCUMENTS

| 4,206,410 A | * | 6/1980 | Ito et al. ...................... 455/203 |
| 4,368,460 A | * | 1/1983 | Clinard et al. ............... 340/522 |
| 4,471,344 A | * | 9/1984 | Williams .................. 340/572.2 |
| 4,807,052 A | * | 2/1989 | Amano .................. 340/825.22 |
| 4,905,279 A | * | 2/1990 | Nishio ......................... 455/352 |
| 4,908,600 A | * | 3/1990 | Martinez ............... 340/310.01 |
| 5,193,210 A |   | 3/1993 | Nicholas et al. |
| 5,369,790 A | * | 11/1994 | Yokota ....................... 455/318 |
| 5,614,891 A |   | 3/1997 | Zeinstra et al. |
| 5,627,529 A | * | 5/1997 | Duckworth et al. ... 340/825.69 |
| 5,699,055 A |   | 12/1997 | Dykema et al. |
| 5,774,064 A | * | 6/1998 | Lambropoulos et al. ..................... 340/825.69 |
| 5,852,784 A |   | 12/1998 | Ito et al. |
| 5,854,593 A |   | 12/1998 | Dykema et al. |
| 5,966,646 A | * | 10/1999 | Lampe et al. ............. 455/190.1 |
| 6,021,319 A | * | 2/2000 | Tigwell .................... 455/151.2 |
| 6,091,343 A |   | 7/2000 | Dykema et al. |
| 6,137,421 A |   | 10/2000 | Dykema |
| 6,272,318 B1 | * | 8/2001 | Yoshioka .................... 340/7.28 |
| 6,484,018 B1 | * | 11/2002 | Downey et al. ............ 455/255 |
| 6,624,758 B1 | * | 9/2003 | Omata et al. .......... 340/426.36 |

FOREIGN PATENT DOCUMENTS

EP 0903456 A1 * 3/1999 ............ H04B 7/08

* cited by examiner

*Primary Examiner*—Edward F. Urban
*Assistant Examiner*—Lana Le
(74) *Attorney, Agent, or Firm*—Foley & Lardner LLP

(57) ABSTRACT

The short range radio receiver for motor vehicle data comprises antenna circuits (1–4) connected to a unit (10–15) for processing a carrier in a plurality of specific frequency bands which is modulated by a data signal, the unit (10–15) comprising frequency-transposing circuits (11, 23–28) connected to demodulation circuits (13) supplying the demodulated data, and frequency discrimination circuits (21, 22) are provided, connected to the antenna circuits (1–4), to determine respective reception levels within the bands in order to compare them with each other and to control the frequency transposing circuits (11, 23–28) depending on the result of the comparison.

8 Claims, 1 Drawing Sheet

MULTIBAND SHORT RANGE RADIO RECEIVER FOR MOTOR VEHICLE DATA

TECHNICAL FIELD

The invention relates to short range radio receivers installed in motor vehicles to receive data such as, for example remote control signals for locking and unlocking the doors.

BACKGROUND ART

Conventional receivers for such remote control signals operate in a single frequency band, around 434 MHz in France and 315 MHz in the LISA and Japan.

By reason of this uniqueness of band within a specific country, there is often interference between the portable remote control transmitters of vehicles parked on the same car park.

On the other hand, on a worldwide level, the manufacturers of these receivers must design them according to the requests of the motor vehicle manufacturers, i.e. in limited production runs which are more expensive. It will also be noted that another frequency band, around 868 MHz, is now permitted in Europe.

The Applicant desires therefore to provide a multi-band universal receiver able to adapt to transmissions from transmitters of various frequency bands.

SUMMARY OF THE INVENTION

To this end, the invention relates to a short range radio receiver for motor vehicle data, comprising antenna means connected to a unit for processing a received carrier in a specific band of frequencies which is modulated by a data signal, the unit comprising means for frequency transposition of the carrier, which are connected to means for demodulating the transposed carrier, which are arranged to supply the demodulated data, characterized in that the antenna means are arranged to receive a plurality of frequency bands, and that frequency discrimination means are provided, connected to the antenna means, arranged to determine respective reception levels within the bands in order to compare them with each other and to control the frequency transposing means depending on the result of the comparison.

Therefore, since the receiver is able to receive signals in only one of its bands, the band which has the most energy is the useful band in practice.

BRIEF DESCRIPTION OF THE DRAWING

The invention will be better understood with the aid of the following description of a preferred embodiment of the receiver of the invention with reference to FIG. 1 which schematically shows the circuits thereof.

DETAILED DESCRIPTION OF THE PREFERRED EMBODIMENT

Figure 1:
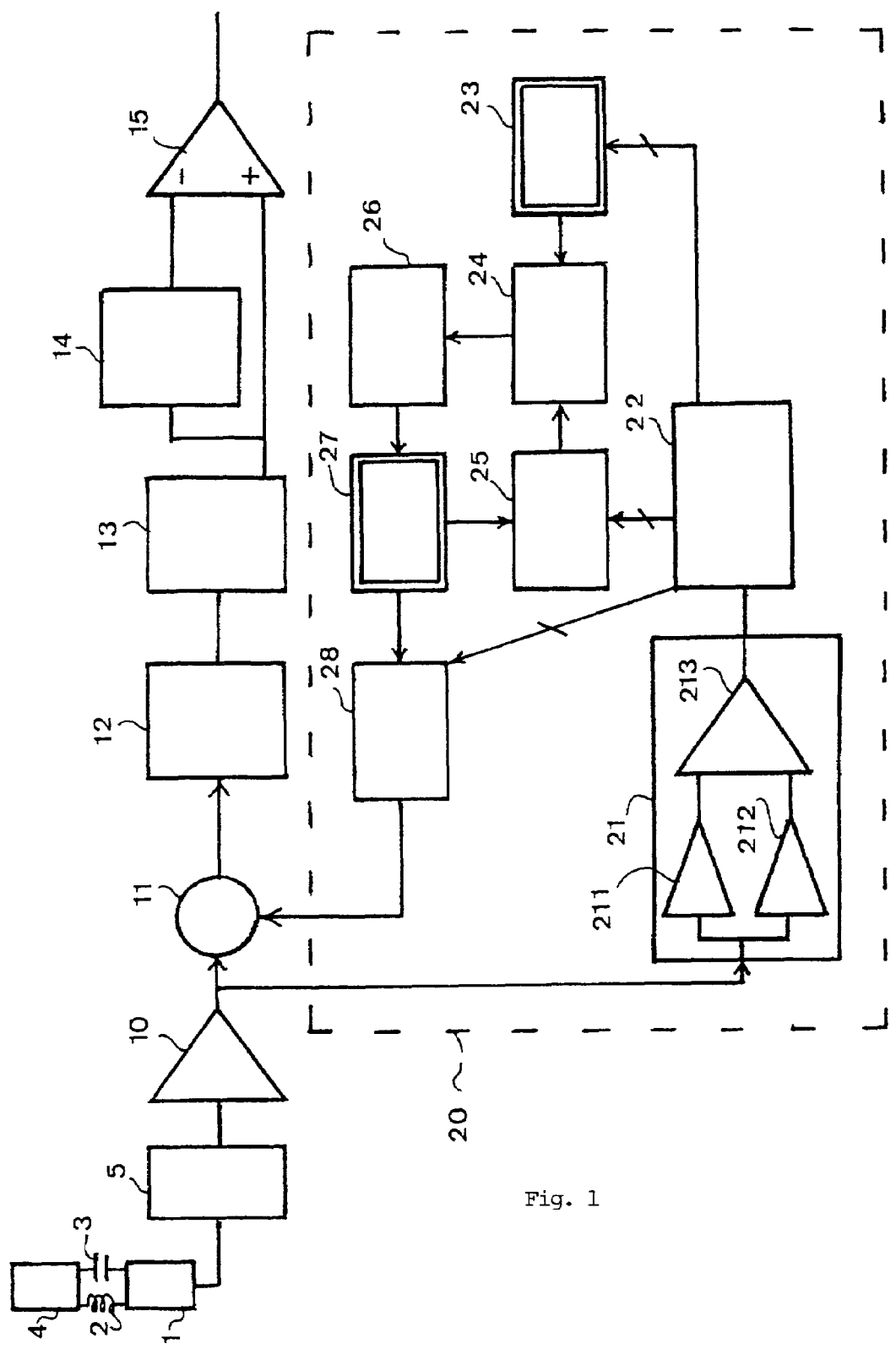

The multi-band receiver illustrated is a two-band receiver in this example and comprises an antenna for receiving a carrier modulated by binary data, the antenna being formed by a radiating element 1 tuned to a quarter wave on the 868 MHz band and connected to an identical element 4 via a tuned circuit L, C, with inductance 2 and capacitor 3 in parallel, tuned to the 868 MHz band. The assembly constitutes a resonant antenna tuned to 434 and 868 MHz. The element 1 is connected to the input of a band-pass filter 5 with two bands centred on 434 and 868 MHz, which controls a low noise amplifier 10. At the output of the amplifier 10 is a frequency-changing or frequency-transposing mixer 11 supplying a carrier signal transposed to a fixed intermediate frequency, in this case 10.7 MHz which passes through a band-pass filter 12 and a demodulator 13 providing the demodulated data to the non-inverting input of an amplitude comparator 15 and to the inverting or subtractive input thereof via an integrator circuit 14. The integrator circuit 14 provides a reference threshold value, ie. substantially half the peak value (bit=1) which it stores, of the demodulated signals. The comparator 15 thus provides the bits 0 and 1 of the received signal.

The mixer 11 is controlled in accordance with the invention in such a way as to select one of the frequency bands which the antenna 1 to 4 can effectively receive, ie. 868 MHz (the tuned circuit LC then isolates the element 4) or even the half frequency of 434 MHz for which the circuit LC 2, 3 is receptive and the elements 1 and 4 equate to a single element tuned to a quarter wave at 434 MHz.

The mixer 11 for supplying a signal at an intermediate frequency is controlled by the assembly of circuits 21 to 28 generally referenced 20.

To this end, the output of the amplifier 10 is connected to a frequency band selector or discriminator circuit 21 which comprises two circuits 211, 212 tuned respectively to the two bands and each supplying a rectified and integrated signal having the radio energy level received in the band concerned. The circuits 211, 212 are thus frequency-shifted band-pass filters, each followed by a rectifier and integrator.

A comparator 213 compares the amplitudes of the two afore-mentioned level signals and provides a bit corresponding to a microprocessor 22, thus designating the useful band providing the most energy.

The microprocessor 22 controls operation of a frequency generator 23 to 28 forming a local oscillator to control the frequency according to the output of the comparator 213, thus according to the useful band.

The local frequency generator comprises a stable master oscillator 23 connected to a first input of a phase comparator 24 which, via a loop band-pass filter 26, controls a slave oscillator 27 of adjustable frequency, in this case controlled by the voltage (VCO), of which the output is looped to a second input of the phase comparator 24 via a divider by a factor M, referenced 25. The output of the VCO 27 controls the mixer 11 via a divider by N, referenced 28.

In this example, the microprocessor 22 controls or adjusts the frequency of the frequency generator 23 to 28 both by the dividers 25 and 28 and by the adjustable-frequency oscillator 23. In another example, only one of these three control means could be provided.

The dividers 25 and 28 are each formed by one or more counters that count the periods of the signal, forming a clock and originating from the circuit upstream. These counters provide successive identical patterns of different counting states, each pattern comprising a specific and adjustable number of states. The counters of the divider in question thus perform a count in a loop of adjustable length and provide, for each particular state of the loop which is decoded, a change-of-state pulse for a downstream stage of division by 2, output from the divider 25 or 28. The downstream divide-by-2 stage thus provides alternately a value-0 signal during one passage of the loop and a value-1 signal of the same duration during the following passage. This signal thus has a 0.5 form factor and its energy spectrum is thus essentially centred on its basic frequency which permits the mixer 11 to operate with a good output.

In this example, the adjustment of the length of the loop determining the values M and N is carried out by decoding the state "all set" of the series of counters concerned in order, upon arrival of the following clock signal of the upstream circuit, to place the counters in an initial state determined by the microprocessor 22 instead of allowing it to naturally fall to the state "all reset". The number of states, from the initial state thus set to the final "all set" state, corresponds to the value M or N desired, to the factor 2 close to the output divider stage, for time regeneration. This pre-placement is carried out by setting the desired elementary stages of the counters by parallel individual input gates each controlled by a particular bit of the microprocessor 22 and all unlocked by the state "all set".

The operation of the receiver will now be explained in more detail.

The operation of the main chain of circuits 5 and 10 to 15 is standard and well known so there is no need of additional explanation.

The selector circuit 21 operates permanently or cyclically to control the microprocessor 22 and thus the mixer 11 without any considerable delay in order to provide the downstream stages 12 to 15 with a useful signal.

When radio signals are received in one of the bands, the comparator 213 then identifies this band by comparison of the respective levels of the signals of two bands from the circuits 211 and 212 and informs the microprocessor 22 thereof. In this instance it is assumed that the simultaneous reception of useful signals in the two bands is impossible. In order to avoid the noise from one band at rest exceeding the useful signal level of the other band which is detected with less sensitivity, it is preferable to take into account, for the comparison of the received levels, the ratio of sensitivities in the two respective bands, for example by proportionally amplifying or attenuating the output signal of the appropriate circuit 211 or 212, in order to make the two detection sensitivities equal.

The VCO 27 oscillates at a frequency M times higher than that of the oscillator 23 and can therefore operate under good conditions. It provides a frequency N times lower than its own frequency to the mixer 11. This frequency displays a difference of 10.7 MHz in this example with respect to the antenna carrier which it is desired to transpose to the intermediate frequency mentioned above. The output frequency of the local oscillator 23 to 28 must therefore be 868±10.7 =857.3 MHz or 878.7 MHz for the high band, or 434 MHz lower than the case above or 423.3 or 444.7 MHz for the low band.

In order to pass from one of the frequencies of the high band to one of the frequencies of the low band and vice versa, the microprocessor 22 modifies, for example the coefficient M or N by a factor 2 or close to 2 and adapts the adjustment by modification of the other coefficient N or M. It will be noted that the high numbers M and N permit more precise adjustment. The oscillator 23 can also be adjusted, but in this case within a limited range because it has a good level of selectivity which ensures that its frequency is stable.

In one variation the divider 25 interposed on the input of the comparator 24, connected to the VCO 27 could be replaced by a multiplier of rank M interposed on the opposite input. In both cases the divider 25 or opposite equivalent multiplier brings about a change of frequency to tune the slave oscillator 27 according to the frequency of the master oscillator 23.

In order to avoid useless switching by reason of the noise in the comparator 213 in the absence of any useful signal at the antenna 1 to 4 a threshold circuit can be provided comprising an additional double comparator which compares each of the two signals at the input of the comparator 213 with a low threshold adapted to the sensitivity in each band and which, if neither of the two signals exceeds the associated low threshold, locks the comparator 213 in a predetermined state or signals to the microprocessor 22 in order to inhibit any new command on its part, in the absence of any useful signal. In one variation the comparator 213 itself fulfills this function of protection against noise and its inputs then each comprise, to this end, a threshold circuit which removes a certain voltage level from each of the two level signals received from the circuits 211 and 212. This threshold circuit can, as a variation, be provided in these latter circuits.

To deal with the case of the absence of any external command at its two inputs owing to the absence of a useful signal and to threshold circuits which eliminate noise, the comparator 213 thus preferably comprises a circuit for at-rest priority polarisation of one of its two inputs, such that high return resistance at a positive voltage which provides an internal low level command avoiding any oscillation of the output. This input then has priority with respect to the other in the absence of any external command. This internal command becomes ineffective when a useful external signal appears on the other input and thus causes the at-rest state to cease.

What is claimed is:

1. Short range radio receiver for motor vehicle data, comprising antenna means (1–4) connected to a unit (10–15) for processing a received carrier in a specific band of frequencies which is modulated by a data signal, the unit (10–15) comprising means (11, 23–28) for frequency transposition of the carrier, which are connected to means (13) for demodulating the transposed carrier, which are arranged to supply the demodulated data, the receiver being characterised in that the antenna means (1–4) are arranged to receive a plurality of frequency bands, and that frequency discrimination means (21, 22) are provided, connected to the antenna means (1–4), arranged to determine respective reception levels within the bands in order to compare them with each other and to control the frequency transposing means (11, 23–28) depending on the result of the comparison.

2. Receiver according to claim 1, wherein the frequency transposing means comprise a slave loop (24–27) of a slave oscillator (27) with respect to a master oscillator (23).

3. Receiver according to claim 2, wherein the slave loop (24–27) comprises a phase comparator (24) connected to the two oscillators (23, 27) by two respective inputs, with an adjustable frequency-changing circuit (25) interposed on one of the inputs and arranged to be controlled by the discriminator means (21, 22).

4. Receiver according to claim 2, wherein the loop (24–27) controls a mixer (11) for transposing the frequency of the received signal via a frequency divider (28) arranged to be controlled by the discriminator means (21, 22).

5. Receiver according to claim 2, wherein the master oscillator (23) is arranged so that its frequency is controlled by the discriminator means (21, 22).

6. Receiver according to claim 1, wherein the discriminator means (21, 22) comprise two frequency-shifted band-pass filters (211, 212) connected to the inputs of a comparator (213) for selecting the frequency band.

7. Receiver according to claim 6, wherein the comparator (213) comprises, at its input, two noise-eliminating threshold circuits.

8. Receiver according to claim 7, wherein the comparator (213) comprises a circuit for at-rest priority polarisation of one of its inputs with respect to the other.

* * * * *